(12) United States Patent
Lecheler et al.

(10) Patent No.: US 6,469,986 B1
(45) Date of Patent: Oct. 22, 2002

(54) METHOD AND SYSTEM FOR CONFIGURING A NETWORK MANAGEMENT NETWORK

(75) Inventors: Paul A. Lecheler, Allen; Javid Jabbarnezhad, Parker, both of TX (US)

(73) Assignee: Electronic Data Systems Corporation, Plano, TX (US)

(*) Notice: Subject to any disclaimer, the term of this patent is extended or adjusted under 35 U.S.C. 154(b) by 0 days.

(21) Appl. No.: 09/177,674

(22) Filed: Oct. 22, 1998

(51) Int. Cl.$^7$ .............................................. H04J 15/00
(52) U.S. Cl. ....................................... 370/252; 370/253
(58) Field of Search ................................ 370/229–238, 370/250, 252, 253, 389, 450, 453, 457, 395.21–395.42; 709/220–226; 707/100

(56) References Cited

U.S. PATENT DOCUMENTS

| | | | |
|---|---|---|---|
| 5,818,842 A | * 10/1998 | Burwell et al. ............. 370/250 |
| 6,061,332 A | * 5/2000 | Branton et al. ............. 709/221 |
| 6,108,782 A | * 8/2000 | Fletcher et al. ............. 370/252 |
| 6,304,877 B1 | * 10/2001 | LeBlanc ..................... 707/100 |

OTHER PUBLICATIONS

The Simple Times, vol. 3, No. 2, (8/94) pp 1–19.*

* cited by examiner

Primary Examiner—Salvatore Cangialosi
(74) Attorney, Agent, or Firm—Baker Botts, LLP

(57) ABSTRACT

A method of configuring a network management network (10) including a computer network (20), a network management system (30), and a data link (40) for coupling the computer network to the network management system includes determining at least one network management parameter for the network management network (10), including the number of network devices (22) on the computer network (20). The method also includes calculating a data link (40) capacity in response to determining the at least one network management parameter and the number of network devices (22) and configuring (160) the network management network (10) in response to determining the at least one network management parameter and calculating the data link (40) capacity.

19 Claims, 2 Drawing Sheets

METHOD AND SYSTEM FOR CONFIGURING A NETWORK MANAGEMENT NETWORK

TECHNICAL FIELD OF THE INVENTION

This invention relates generally to computer networks and more particularly to a method and system for configuring a network management network.

BACKGROUND OF THE INVENTION

Virtually all companies today require computer networks, but many companies are not capable of creating and maintaining these networks in-house. Therefore, many companies turn to firms that specialize in developing and maintaining computer networks within other companies. Such firms, which are sometimes referred to as network providers, need to be able to monitor the computer networks that they set up for their customers in order to maintain them. A network management system is often used to perform this monitoring function to ensure optimal performance. Therefore, it is common for these network providers to establish a data link between their customer's network and a network management system situated in a different location than the computer network.

In addition, even large companies that manage their own computer networks may choose to monitor their own networks internally. In such instances, the network management team similarly establishes a data link between their network management system and the computer networks.

The required capacity of this data link is an important issue when installing the network. Currently, many network managers use a "trial and error" method to determine the data link capacity required to monitor the computer network. These managers basically guess, based on experience, at the size of the data link that will be needed to support the network at the present and in the future. The result is often either an over- or undersized data link. If the data link is oversized, this results in excess charge to the customer for superfluous data capacity. If the data link is undersized, this results in the inability of the network provider to sufficiently and accurately monitor the customer's network. Both situations lead to an inefficient allocation of resources and cost both the customer and the network provider.

SUMMARY OF THE INVENTION

Accordingly, a need has arisen for an improved method and system for more accurately predicting the data link capacity required to support a particular network, or conversely, the configuration and operation of the network that can be supported by an existing data link size. The present invention provides a system and method for configuring a network management network that addresses the shortcomings of prior methods.

According to one embodiment of the invention, a method of configuring a network management network including a computer network, a network management system, and a data link for coupling the computer network to the network management system. The method including determining at least one network management parameter for the network management network, including the number of network devices on the computer network. The method also including calculating a data link capacity in response to determining the at least one network management parameter and the number of network devices, and configuring the network management network in response to determining the at least one network management parameter and calculating the data link capacity.

According to another embodiment of the invention, a system for specifying a configuration for a network management network, the system including a storage medium, a processor coupled to the storage medium, and a computer program stored in the storage medium. The computer program is operable to run on the processor. The program is further operable to receive a desired number of network devices on a computer network, the network devices having an average number of interfaces to a computer network. The computer program is also operable to calculate a configuration bandwidth per network device sufficient to periodically poll the network devices across a data link in order to monitor configuration changes and performance parameters in the computer network. The configuration bandwidth is calculated by multiplying a configuration polling rate for determining the configuration of the computer network and a configuration data packet size for determining the configuration of the computer network. The computer program is further operable to calculate a performance bandwidth per network device sufficient to periodically poll the network devices across the data link in order to monitor performance of the computer network. The performance bandwidth is calculated by multiplying a performance polling rate for determining the configuration of the computer network, a performance data packet size for determining the configuration of the computer network, and the number of interfaces per network device. The computer program is further operable to calculate a data link capacity sufficient to manage the computer network by multiplying the sum of the configuration and performance bandwidths by the number of network devices on the computer network, and provide the calculated data link capacity.

Embodiments of the invention provide numerous technical advantages. For example, the present invention eliminates the previous "trial and error" method of configuring a network management network. Instead of simply making an educated guess as to the allocated data link capacity sufficient to manage a given number of network devices, network managers can utilize the present invention to accurately determine the data link capacity required. Likewise, the network manager can determine the maximum number of network devices on the computer network that can be effectively managed given an allocated data link capacity.

In addition, when managing an existing computer network, the present invention can be utilized to vary one or more network management parameters to enhance the performance of the network management network. For example, if the maximum number of network devices has been reached for a given allocated data link capacity, the network manager could increase the allocated data link capacity, decrease a polling rate associated with network management, or decrease a packet size of data transferred over the network management network.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Figure 1:
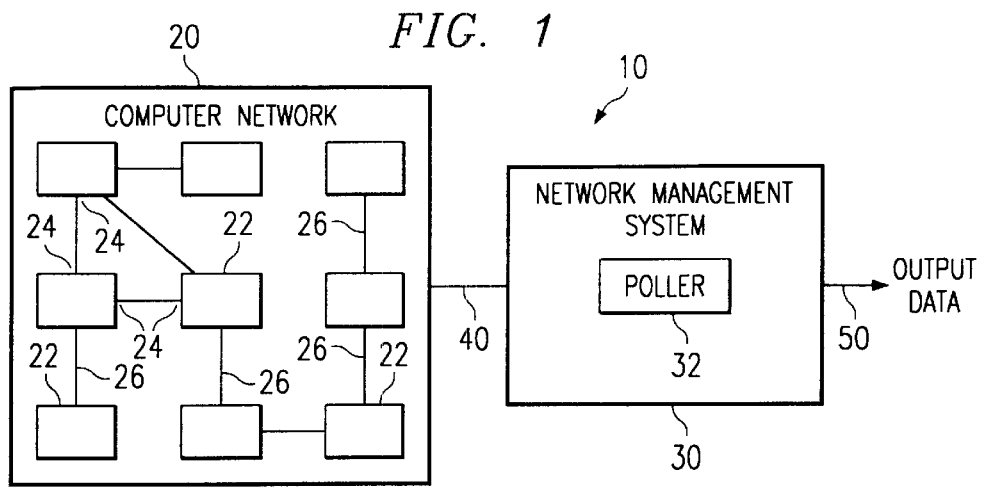
FIG. 1 is a block diagram illustrating a network management network according to the teachings of the present invention.
Figure 3:
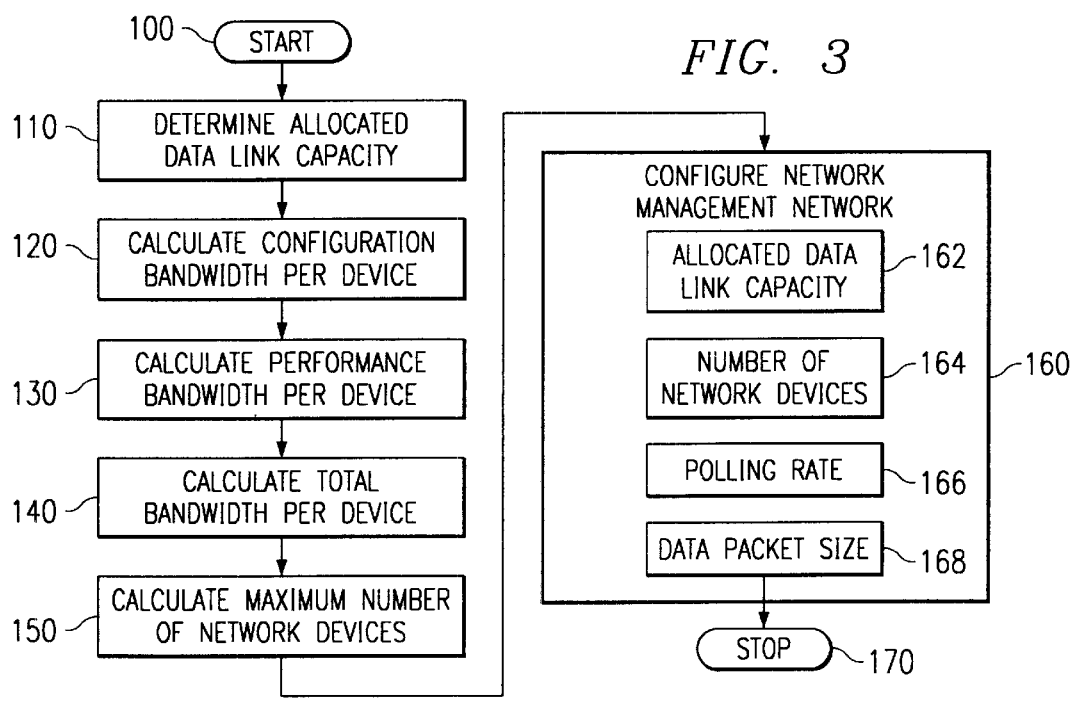
FIG. 3 is a flowchart illustrating a method for configuring the network management network of FIG. 1.
Figure 2:
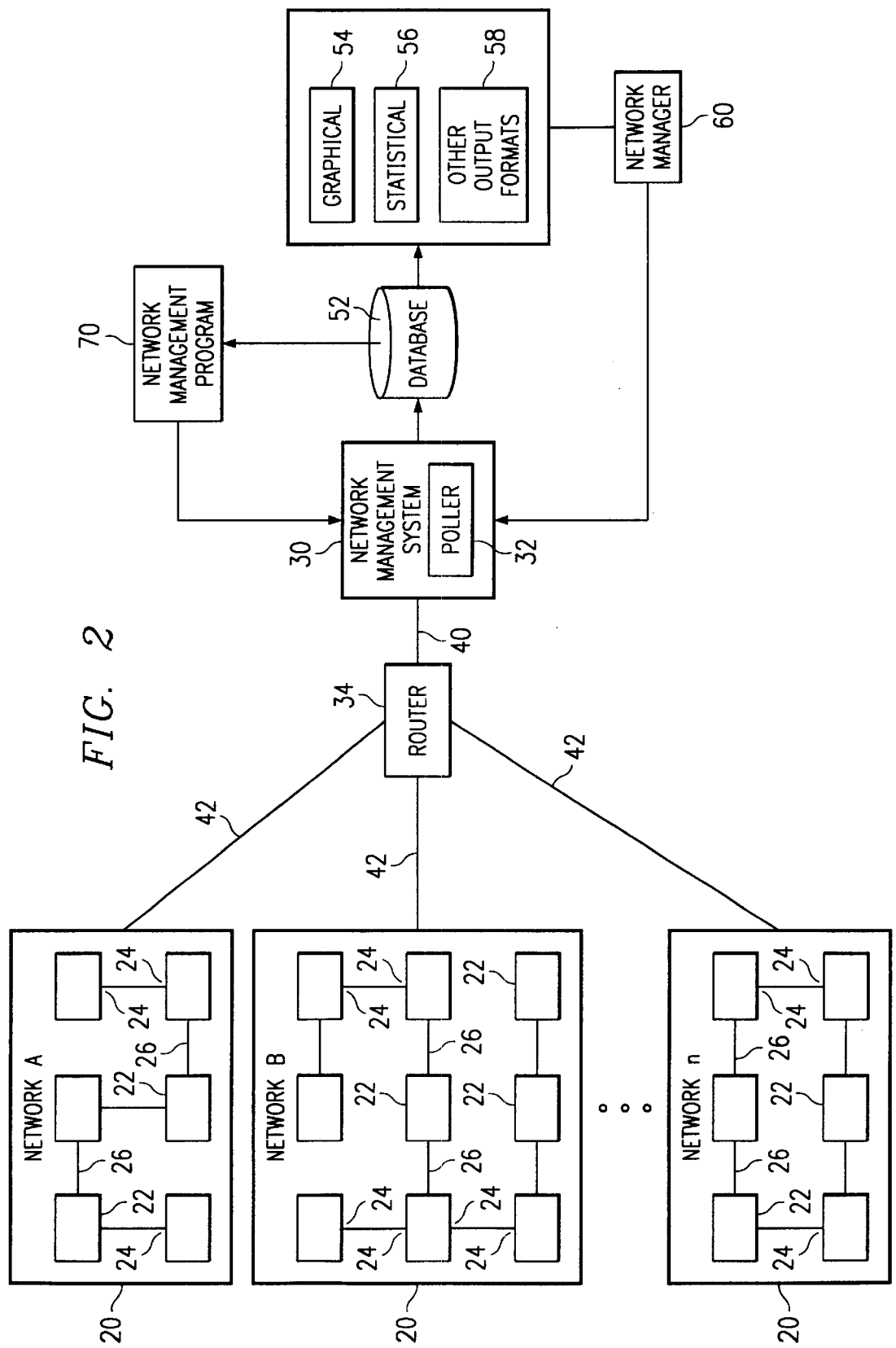
FIG. 2 is a block diagram illustrating additional details of one embodiment of the network management network of FIG. 1.

The present invention and its advantages are best understood by referring to FIGS. 1 through 3 of the drawings, like numerals being used for like and corresponding parts of the various drawings.

FIG. 1 is a block diagram of a network management network 10 according to the teachings of the present invention that is created in order to monitor the performance and operations of a computer network 20. Computer network 20 comprises a plurality of network devices 22. Network devices 22 may include, but are not limited to, routers, switches, hubs, bridges, gateways, firewalls, terminals, and remote access devices. Network devices 22 may be interconnected with other network devices 22 through paths 26. Paths 26 are coupled to network devices 22 through a network interface 24 located on network device 22. Computer network 20 can use any available type of networking technology. Examples of suitable networking technologies include, but are not limited to, Asynchronous Transfer Mode and Ethernet. Computer network 20 can also use any available type of network architecture. Examples of suitable network architectures include, but are not limited to, Systems Network Architecture (SNA), Transmission Control Protocol/Internet Protocol (TCP/IP), and NetWare.

Computer network 20 is monitored by a network management system 30. A network management system is a system that monitors a computer network's physical and operating parameters in order to enhance the performance of computer network 20. Embodiments of network management system 30 include, but are not limited to, HEWLETT-PACKARD OPENVIEW SOLUTION FRAMEWORK®, TIVOLI MANAGEMENT ENVIRONMENT®, and MICROSOFT SYSTEMS MANAGEMENT SERVER®. Network management system 30 is coupled with computer network 20 by a data link 40. In one embodiment data link 40 is a physical communications cable. Other embodiments of data link 40 include, but are not limited to, microwave, radio wave, T1, and T3 connections.

Network management system 30 includes a poller 32 that sends queries over data link 40 to computer network 20. The purpose of such queries is to monitor the physical and operational "health" of computer network 20. The invention recognizes that the operation of poller 32 depends on several network management parameters. Examples of network management parameters include, but are not limited to, the number of network devices 22 on computer network 20, the number of network interfaces 24 per network device 22, the allocated capacity of data link 40, the polling rate, and the polling data packet size. The polling rate is the frequency at which network management system 30 sends queries to computer network 20. The polling data packet size is the amount of data contained in the reply of each network device 22 to each query. Once network management system 30 has polled the computer network 20 to obtain information concerning computer network 20, network management system 30 may then output this information over a data path 50 to be analyzed in order to enhance the performance of computer network 20.

According to the present invention, a relationship between the network management parameters is developed that allows the data link capacity or a maximum number of network devices 22 to be determined based upon the other network management parameters. For example, the required data link capacity is determined by the volume of information exchanged between network management system 30 and computer network 20. The volume of information passing through data link 40 is a function of polling rate, the data packet size, and the total number of network devices 22 that answer each poll. If the optimal data link capacity can be determined for a given set of network management parameters, then network management network 10 can be initially configured and subsequently modified in an efficient and accurate manner. Additional details of the relationship between the network management parameters are described below in conjunction with FIGS. 2 and 3.

FIG. 2 is a block diagram showing another embodiment of network management network 10 of FIG. 1. In this embodiment a plurality of computer networks 20 are monitored by network management system 30. Data link 40 connects network management system 30 to a router 34. Router 34 connects each computer network 20 to data link 40 via individual data links 42. In this way, network management system 30 can be used to monitor a plurality of computer networks 20 by sending queries over data link 40 through router 34 and then over individual data links 42 to individual computer networks 20. The polling rate and the polling data packet size can be varied for each individual computer network 20.

According to the present invention, the capacities of data link 40 and individual data links 42 sufficient to manage computer networks 20 can be calculated. According to the invention, the capacity of each individual data link 42 is a function of the number of network devices 22 on corresponding computer network 20, the polling rate for that computer network 20, and the polling data packet size for that computer network 20. The capacity of main data link 40 is the sum of the capacities of individual data links 42. Similarly, the maximum number of devices on each computer network 20 can be calculated according to the present invention.

The embodiment shown in FIG. 2 illustrates additional components used to process information received by the polling of computer networks 20. Such additional components could be incorporated in the embodiment illustrated in FIG. 1. Once network management system 30 polls computer network 20, it may then output the received information to a database 52. The information in database 52 can then be converted to a graphical format 54, a statistical format 56, or any other type of organizational format 58 including, but not limited to, charts, lists and tables. Output formats 54, 56, 58 can than be analyzed by a network manager 60. Network manager 60 may be an operator of computer network 20 or an activated system. Network manager 60 can then configure the computer network 20 in order to enhance its performance. In addition, the information received by and stored in database 52 can also be directed to a network management program 70 capable of automatically configuring computer network 20 in order to enhance its performance. Network management program 70 can be any type of hardware or software capable of receiving data and responding to that data by altering various network parameters. Additional details of a method for configuring network management network 10 are described in greater detail below in conjunction with FIG. 3.

FIG. 3 is a flowchart illustrating one method by which network management network 10 can be configured in order to enhance its performance. The method begins at a step 100. At a step 110 the capacity of data link 40 that has been allocated to network polling by network management system 30 is determined. This allocated data link capacity is a percentage of the total capacity of data link 40. One consideration in allocating data link capacity to polling operations is the amount of capacity that is required for network management operations other then network polling. However, other considerations may be included in allocating data link capacity for network polling.

The allocated data link capacity is expressed in terms of the amount of data that can be transmitted over data link 40 during a given time interval. The allocated data link capacity may be expressed using any measurement of the amount of data traveling over data link 40. Examples of suitable measurements include, but are not limited to, bytes, bits and octets. The allocated data link capacity may also be expressed using any time interval. Examples of suitable intervals include, but are not limited to, seconds, minutes, hours and days. In one embodiment of the present invention, the allocated data link capacity is expressed in octets per day. If the speed of data link 40 is expressed in bits per second, the allocated data link capacity can be expressed in octets per day using the following formula:

$$LC = \left(\frac{LS}{8} * AC\right) * 3600 * 24$$

where LC is the allocated data link capacity, LS is the data link speed in bits per second, and AC is the percentage of the data link capacity that is allocated to the polling operations of network management system 30. In one embodiment of the present invention, an allocation of 80% of the data link capacity to polling operations has been shown to produce desirable results. In the above formula, multiplying 3600 by 24 calculates the number of seconds in a day. This calculation could be altered if a time interval other than a day was chosen. Also in the above formula, the data link speed (LS) is divided by eight because there are eight bits in an octet. It should be noted that the use of octets is beneficial because an octet is universally defined as eight bits. This is unlike the definition of a byte, which consists of eight bits in certain locations and seven bits in others.

The number of devices that can be supported by the allocated data link capacity is related to the amount of data transmitted between each network device 22 and network management system 30. Part of the data transmitted over data link 40 are queries from network management system 30 to computer network 20, and the corresponding responses of network devices 22. In one embodiment of the present invention, network management system 30 makes two types of queries of computer network 20. A first type of query, a configuration poll, is used to determine information about the configuration of computer network 20. Such configuration information includes, but is not limited to, the addition or removal of network devices 22, protocols supported by network devices 22, types of networks supported by network devices 22, and caching, routing, and interconnecting information for computer network 20. A second type of query, a performance poll, is used to determine how network devices 22 are being utilized. Information obtained during a performance poll includes, but is not limited to, data loss during transmission, inability or decreased ability of network devices 22 to connect or communicate with other network devices 22, and usage information, error rates, processor usage information, memory usage information, and general performance information.

At a step 120 a configuration bandwidth sufficient for network management system 30 to perform periodic configuration polls of computer network 20 is calculated. This configuration bandwidth is the amount of data link capacity required per network device 22 to send a response to a configuration polling query by the network management system 30. The configuration bandwidth is calculated according to the following formula:

$$CB = CPR * CDS$$

where CB is the configuration bandwidth required per network device 22, CPR is the configuration polling rate, and CDS is the configuration data packet size. The configuration polling rate is the number of times that network management system 30 polls computer network 20 during the relevant time interval. By increasing the polling rate, the configuration of computer network 20 can be monitored more often, and thus better data can be obtained. However, increasing the polling rate also increases the amount of data being transmitted over the data link during a given time interval. The configuration data packet size is the amount of data that each network device 22 returns in response to the configuration poll. By increasing the data packet size, more configuration information can be obtained during each poll. However, increasing the packet size also increases the amount of data being transmitted over the data link during a given time interval. It should be understood that although a single data packet is referred to, this packet may be divided into smaller portions while being transmitted in computer network 20 and to network management system 30. The polling rate and data packet size are often a function of the type of network management system 30 used. However, the polling rate and data packet size used for a given type of network management system 30 can be altered to enhance the operation of network management network 10.

At a step 130 a performance bandwidth sufficient for network management system 30 to perform periodic performance polls of computer network 20 is calculated. The performance bandwidth is the amount of data link capacity required per network device 22 to send a response to a performance polling query by the network management system 30. The performance bandwidth is calculated according to the following formula:

$$PB = PPR * PDS * I$$

where PB is the performance bandwidth required per network device 22, PPR is the performance polling rate, PDS is the performance data packet size, and I the number of interfaces 24 per network device 22. The performance polling rate is the number of times that network management system 30 polls computer network 20 during the relevant time interval. By increasing the polling rate, the performance of computer network 20 can be monitored more often, and thus better data can be obtained. However, increasing the polling rate also increases the amount of data being transmitted over the data link. The performance data packet size is the amount of data that each network device 22 returns in response to the performance poll. By increasing the data packet size, more performance information can be obtained during each poll. However, increasing the polling rate also increases the amount of data being transmitted over the data link during a given time interval. It should be understood that although a single data packet is referred to, this packet may be divided into smaller portions while being transmitted in computer network 20 and to the network management system 30. The polling rate and data packet size are often a function of the type of network management system 30 used. However, the polling rate and data packet size used for a given type of network management system 30 can be altered to enhance the operation of network management network 10. Finally, the number of interfaces 24 per network device 22 is the number of connections each network device 22 has to computer network 20. This number can be the average number of interfaces 24 per network device 22 if all network devices 22 do not have the same number of interfaces 24. In one embodiment of the invention, it has been shown that the use of ten interfaces per network device 22 for the variable I produces desirable results. This value provides a good approximation in many cases if the exact value of I is not known.

At a step 140 the total bandwidth required for polling the computer network is calculated. The total bandwidth required is the sum of all the bandwidths required per network device 22 for each distinct type of poll performed by network management system 30. In one embodiment of the invention, the total bandwidth required is the sum of the configuration bandwidth and the performance bandwidth. This can be expressed in the following formula:

$$TB=CB+PB$$

where TB is the total required bandwidth, CB is the configuration bandwidth calculated in step 120, and PB is the performance bandwidth calculated in step 130.

At a step 150, the maximum number of network devices 22 to be coupled with computer network 20 is calculated based on the total bandwidth required. This calculation can be represented by the following formula:

$$ND = \frac{LC}{TB}$$

where ND is the maximum number of network devices 22, LC is the allocated data link capacity, and TB is the total required bandwidth. The formula can be expanded as follows using the calculations in the preceding steps:

$$ND = \frac{LC}{(CPR*CDS) + (PPR*PDS*I)}$$

The following is a sample calculation of the maximum number of network devices 22 given a 56 kilobits per seconds (Kbps) data link 40 (LC), 80% of data link capacity allocated to polling (AC), a configuration polling rate (CPR) of six times per day, a configuration data packet size (CDS) of 15,000 bytes (octets), a performance polling rate (PPR) of 96 times a day (every fifteen minutes), a performance data packet size (PDS) of 4000 bytes (octets), and ten interfaces per device (I). In this example, ten interfaces is the average number of interfaces per device. First, the allocated data link capacity is determined:

$$LC = \left(\frac{56000}{8} * .80\right) * 3600 * 24 = 483,840,000 \text{ octets per day}$$

Second, the configuration bandwidth is calculated:

$$CB=CPR*CDS=6*15000=90,000 \text{ octets per device per day}$$

Third, the performance bandwidth is calculated:

$$PB=PPR*PDS*I=10*4000*96=40,000 \text{ octets per device per day}$$

Fourth, the total bandwidth is calculated:

$$TB=CB+PB=90000+40000=130,000 \text{ octets per device per day}$$

Finally, the maximum number of network devices is calculated:

$$ND = \frac{LC}{TB} = \frac{483,840,000}{130,000} = 3,721 \text{ devices}$$

Therefore, for the given values, the maximum number of network devices 22 that can be managed per day using a 56 Kbps data link 40 is 3,721 network devices 22.

At a step 160 the network management network is configured as required in response to the calculation of the maximum number of network devices 22. Such configuration includes specifying network management parameters when initially establishing network management network 10 or modifying network management parameters in an existing network management network 10. The network management parameters include, but are not limited to, the allocated data link capacity, the number of network devices 22 on computer network 20, the configuration and performance polling rates, the configuration and performance data packet sizes, and the number of interfaces 24 per network device 22.

When initially establishing network management network 10, one concern is what data link capacity will be required for a projected number of network devices 22. It should be understood that the method illustrated in FIG. 3 could be altered so that instead of calculating the maximum number of network devices 22 based on the allocated data link capacity and the total required bandwidth, the required allocated link capacity could be calculated based on the number of network devices 22 and the total required bandwidth. This is accomplished by manipulating the above equation to solve for the data link capacity instead of the maximum number of network devices 22. The new equation reads as follows:

$$LC=ND*TB=ND*((CPR*CDS)+(PPR*PDS*I))$$

By calculating the data link capacity in this manner, an accurate measure of the capacity required for present and future uses can be obtained. By obtaining an accurate measure of the required data link capacity, the likelihood of having to supplement data link 40 in the future is reduced. Alternatively, any other network management parameter can be calculated given the values of the other network management parameters. Network management network 10 could then be initially configured in response to this calculation.

In addition, the present invention can be used to modify the network management parameters of an existing network management network 10. For example, if computer network 20 has reached the maximum number of network devices 22 for a given allocated data link capacity, the polling rates or data packet sizes could be decreased. The present invention could be used to calculate how much to decrease the polling rates or data packet sizes for a given data link capacity and number of network devices 22. Alternatively, the allocated data link capacity could be increased if the maximum number of network devices 22 has been reached. Again, the present invention could be used to calculate the increased allocated data link capacity required. It should be clear that one or more network parameters can be modified in response to one or more other network parameters.

Figure 4:
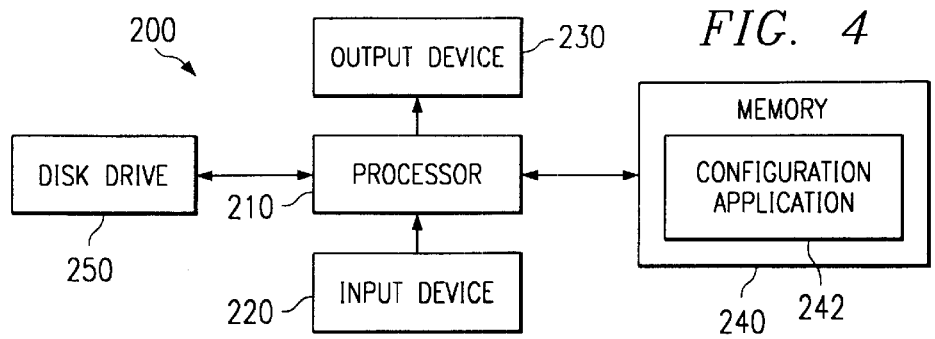
FIG. 4 illustrates an example network configuration system that comprises one embodiment of the present invention.

FIG. 4 illustrates a system for configuring network management network 10 that implements the above-described method. Network configuration system 200 comprises computer software running on a general purpose computer. Network configuration system 200 may be adapted to operate with any type of computer, including those executing any of the well known MSDOS, Windows 95, OS2, UNIX, or MAC-OS operating systems, or other operating systems.

Network configuration system 200 comprises a processor 210, an input device 220, and an output device 230. In one embodiment, network configuration system 200 also comprises two types of storage media, a memory 240 and a disk drive 250. The present invention includes computer software that may be stored in memory 240 or on disk drive 250 and is executed by processor 210. Disk drive 250 may include a variety of types of storage media such as, for example, floppy disk drives, hard drives, CD ROM disk drives, or magnetic tape drives. Data may be received from a user of network configuration system 200 using a keyboard or any other type of input device 220. Data may also be input from other sources, such as another computer, through input device 220. Data may be output to a user of network configuration system 200 through output device 230, which may include a display, printer, or any other type of output device.

Network configuration system 200 includes a configuration application 242, which is a computer software program. In FIG. 4, configuration application 242 is illustrated as being stored in memory 240, where it can be executed by processor 210. Configuration application 242 may also be stored on disk drive 250. Configuration application 242 can receive network management parameters. Configuration application 242 is then operable to calculate at least one network management parameter based on the values of network management parameters that it receives, according to the above-described method. For example, if the configuration application 242 receives the values of the number of network devices 22, the number of network interfaces 24 per network device 22, the polling rates, and the data packet sizes, it can then calculate the data link capacity that is sufficient the manage the computer network as described above. Configuration application 242 could also calculate any other network management parameter. After calculating one or more network management parameters, configuration application 242 can then provide this information through output device 230 to a user. The user may then configure network management network 10 according to the information received from network configuration system 200.

Although the present invention and its advantages have been described in detail, it should be understood that various changes, substitutions, and alterations can be made therein without departing from the spirit and scope of the present invention as defined by the appended claims.

What is claimed is:

1. A method of configuring a network management network, the network management network including a computer network, a network management system, and a data link for coupling the computer network to the network management system, the method comprising:
   determining at least one network management parameter for the network management network, including determining the number of network devices on the computer network;
   calculating a data link capacity in response to determining the at least one network management parameter; and
   configuring the network management network in response to determining the at least one network management parameter and calculating the data link capacity.

2. The method of claim 1 wherein determining at least one network management parameter comprises determining a polling rate for use by the network management system.

3. The method of claim 1 wherein determining at least one network management parameter comprises determining a data packet size for use by the network management system.

4. The method of claim 1 wherein configuring the network management network comprises designating the data link capacity.

5. The method of claim 1 wherein configuring the network management network comprises modifying at least one of the values of the at least one network management parameters in an existing network management network.

6. The method of claim 1 wherein configuring the network management network comprises coupling the computer network to the network management system with a data link having the calculated data link capacity.

7. The method of claim 1 wherein configuring the network management network comprises specifying a polling rate for the network management system.

8. The method of claim 1 wherein determining at least one network management parameter comprises:
   calculating a configuration bandwidth sufficient to periodically poll the computer network for configuration changes in the computer network, the configuration bandwidth calculated by multiplying a configuration polling rate and a configuration data packet size; and
   calculating a performance bandwidth sufficient to periodically poll the computer network devices to monitor performance of the computer network, the performance bandwidth calculated by multiplying the performance polling rate, the performance data packet size, and the number of interfaces per network device.

9. The method of claim 8 wherein calculating the data link capacity comprises multiplying the sum of the configuration and performance bandwidths by the number of network devices on the computer network.

10. A method of configuring a network management network, the network management network including a computer network, a network management system, and a data link for coupling the computer network to the network management system, the method comprising:
   determining at least one network management parameter for the network management network, including determining an allocated data link capacity for the data link;
   calculating a maximum number of network devices to be coupled to the computer network in response to determining the at least one network management parameter; and
   configuring the network management network in response to determining the at least one network management parameter and calculating the maximum number of network devices.

11. The method of claim 10 wherein determining at least one network management parameter comprises determining a polling rate for use by the network management system.

12. The method of claim 10 wherein determining at least one network management parameter comprises determining a data packet size for use by the network management system.

13. The method of claim 10 wherein configuring the network management network comprises designating the number of network devices to be less than or equal to the calculated maximum number of network devices.

14. The method of claim 10 wherein configuring the network management network comprises modifying at least one of the values of the at least one network management parameters in an existing network management network.

15. The method of claim 10 wherein configuring the network management network comprises coupling the computer network to the network management system with the data link.

16. The method of claim 10 wherein configuring the network management network comprises specifying a polling rate for the network management system.

17. The method of claim 10 wherein determining at least one network management parameter comprises:

calculating a configuration bandwidth sufficient to periodically poll the computer network for configuration changes in the computer network, the configuration bandwidth calculated by multiplying a configuration polling rate and a configuration data packet size; and calculating a performance bandwidth sufficient to periodically poll the computer network devices to monitor performance of the computer network, the performance bandwidth calculated by multiplying the performance polling rate, the performance data packet size, and the number of interfaces per network device.

18. The method of claim 17 wherein calculating the maximum number of network devices comprises dividing the allocated data link capacity by the sum of the configuration and performance bandwidths.

19. A system for specifying a configuration for a network management network, the system comprising:

a storage medium;

a processor coupled to the storage medium;

a computer program stored in the storage medium, the computer program operable to run on the processor, the computer program further operable to:

receive a desired number of network devices on a computer network, the network devices having an average number of interfaces to a computer network;

calculate a configuration bandwidth per network device sufficient to periodically poll the network devices across a data link in order to monitor configuration changes in the computer network, the configuration bandwidth calculated by multiplying a configuration polling rate for determining the configuration of the computer network and a configuration data packet size for determining the configuration of the computer network;

calculate a performance bandwidth per network device sufficient to periodically poll the network devices across the data link in order to monitor performance of the computer network, the performance bandwidth calculated by multiplying a performance polling rate for determining the configuration of the computer network, a performance data packet size for determining the configuration of the computer network, and the number of interfaces per network device;

calculate a data link capacity sufficient to manage the computer network by multiplying the sum of the configuration and performance bandwidths by the number of network devices on the computer network; and provide the calculated data link capacity.

* * * * *